United States Patent Office 3,493,733
Patented Feb. 3, 1970

3,493,733
COMPUTING DEVICE TO SIMULATE THE CHARACTERISTICS OF RELATIVE INCREMENTS OF SPECIFIC FUEL CONSUMPTION
Paruir Avetisovich Matevosyan, Ul. Tumanyana 11, kv. 29, Erevan, U.S.S.R.
Filed Dec. 23, 1966, Ser. No. 604,212
Int. Cl. G06f 15/56; G06g 7/62
U.S. Cl. 235—151.21                          3 Claims

ABSTRACT OF THE DISCLOSURE

A computing device is provided for economic distribution of loads among the units of an electric station and among the stations. The device comprises a summator connected at its output to an integrator which is connected at its output to the input of a multiplier in turn connected to a functional unit which simulates the characteristics of relative increments of specific fuel consumption. A program control unit is coupled both to the functional unit and to a relay connected between the summator and integrating unit.

---

The present invention relates to devices for economic distribution of loads along the units of an electric station and among the electric stations of a power system.

Known in the art is the type "Ekran" computer, developed by the Kiev Institute of Automatics, for economic distribution of loads among the electric stations constituting a power system (cf. Proceedings of the All-Union Conference on Application of Analogue Computers in Power Engineering).

The computer comprises D.C. amplifiers, multiplying units in accordance with the number of electric stations involved, and electronic functional units employing diodes.

The disadvantages of the abovesaid computer reside in the fact that much time is required to make up functional units to correspond to the characteristics of relative increments of specific fuel consumption as well as the employment of large number of arithmetic units the number of which increases with the number of electric stations in the power system.

An object of the present invention is to eliminate the abovementioned disadvantages.

The primary object of the present invention is to provide a computing device which employs a much less number of arithmetic units and makes it possible to conveniently and rapidly simulate the characteristics of relative increments of specific fuel consumption.

This object is accomplished by providing a computing device for economic distribution of loads among the units of an electric station and among the electric stations, comprising a summator, an integrating unit coupled thereto, a multiplying unit coupled to the integrating unit, and a functional unit to simulate the characteristics of relative increments of specific fuel consumption, coupled to the multiplying unit wherein, according to the invention, a program control unit is provided which is coupled both to the functional unit and to a relay connected between the summator and the integrating unit.

To take into account possible power losses which occur within the networks of a power system, it is expedient to provide the computing device with voltage dividers capable of being coupled by means of the program control unit to one multiplying unit through one summator only.

For concurrent simulation of the characteristics of relative increments of specific fuel consumption and for storing the load values, the functional unit comprises an amplifier, switching members, electric motors coupled to the amplifier through the switching members, the shafts of said motors mounting replaceable cams so profiled as to correspond to the characteristics of relative increments of specific fuel consumption, potentiometers for setting the voltages proportional to the loads involved, coupled to the cams by means of pushers; potentiometers and switching members to be used for feedback connection of the electric motors and the amplifier.

An embodiment of the present invention will be described hereinbelow by way of illustration of a computing device for economic distribution of active loads among the electric stations of a power system with due reference to the accompanying drawings, in which.

Figure 1:
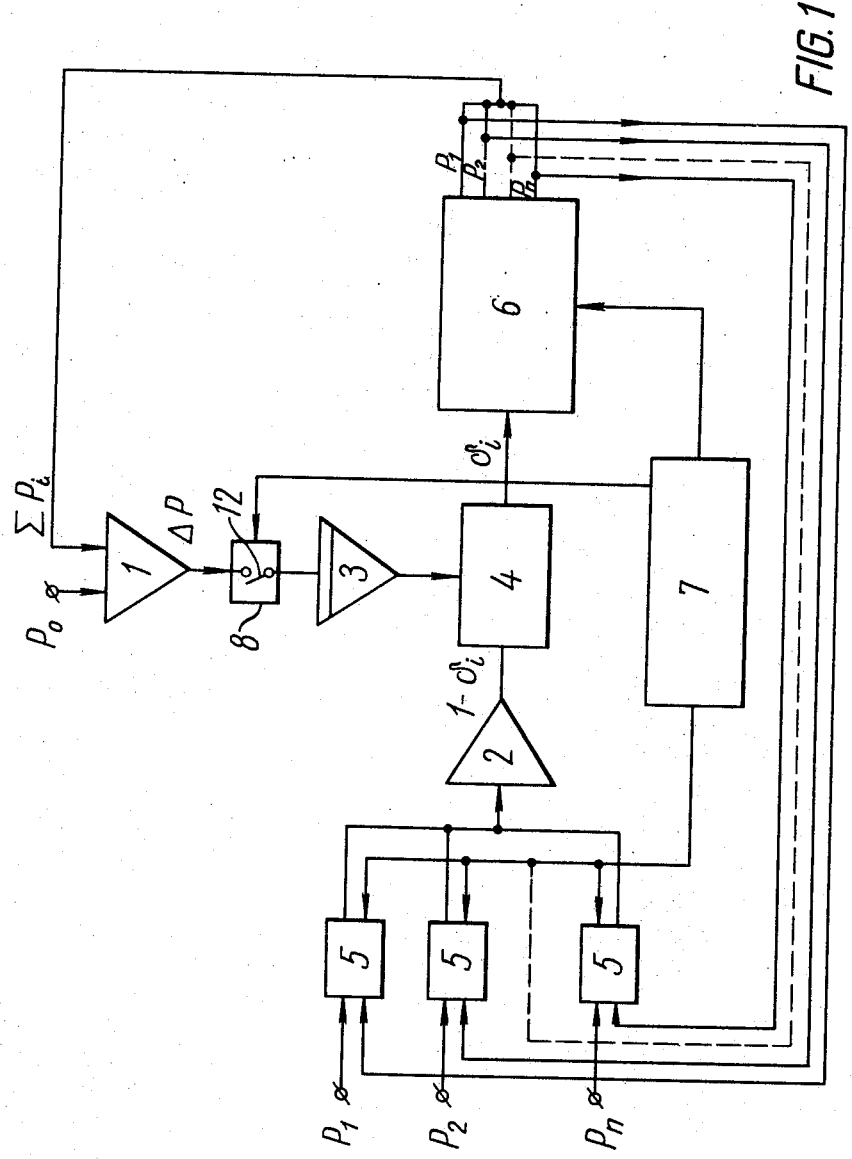
FIG. 1 is a block diagram of the computing device for estimation of active power losses.

The device proposed herein comprises two summators 1 and 2 (FIG. 1), an integrator 3, one multiplying unit 4, voltage dividers 5, a functional unit 6 and a program control unit 7.

The functional system of the computing device is based upon the following conventional equations:

$$P_1 + P_2 + \cdots + P_n - P_0 = 0 \tag{1}$$

$$\frac{\alpha_1 b_1}{1-\sigma_1} = \frac{\alpha_2 b_2}{1-\sigma_2} = \cdots = \frac{\alpha_n b_n}{1-\sigma_n} = \delta_0 \tag{2}$$

wherein:

$$\sigma_i = 2\beta \cdot \sum_1^m B_{im} P_i \tag{3}$$

$P_i$ is the power of the $i^{th}$ electric station of a power system, where $i=1, 2 \ldots n$, $n$ stands for the number of electric stations of a power system;

$P_0$—is a set value of a power load of a system, with power losses taken into account:

$\alpha_1$ is a fuel cost coefficient;

$b_i = f(P_i)$ is a relative increment of specific fuel consumption of the $i^{th}$ electric station;

$\sigma_i$—is a relative increment of power losses within the network;

$\beta$ is a coefficient accounting for the power transmission network configuration ($\beta = 0.98 + 1.02$);

$\beta_{im}$ are line coefficients.

Equation 1 may be accomplished in the computing device by means of the summator 1 (FIG. 1), whereas Equation 3—by means of the summator 2 and voltage dividers 5.

The value $\delta_0$ can be derived from the equation $$\delta_0 = K \int_0^{\Delta t} \Delta P \, dt$$

where $$\Delta P = P_0 - \sum_1^n P_i^1$$

$P'_i$ stands for the power of respective stations in the process of solving the problem in the computing device; and K is a gain factor.

The realization of Equation 1 is made by means of the integrator 3.

The multiplying unit 4 serves to obtain the product $$\frac{1}{\alpha_i}(1-\sigma_i)\delta_0 = b_i$$

Equation $P_i = \psi_{i1}(b_i)$ is realized by means of the electromechanical functional unit 6.

The computing device is equipped with the program control unit 7, coupled to the functional unit 6, the voltage dividers 5 and relay 8 inserted between the summator 1 and the integrator 3. The functional coupling among the units of the computing device is effected in accordance with Equations 1, 2 and 3.

Figure 2:
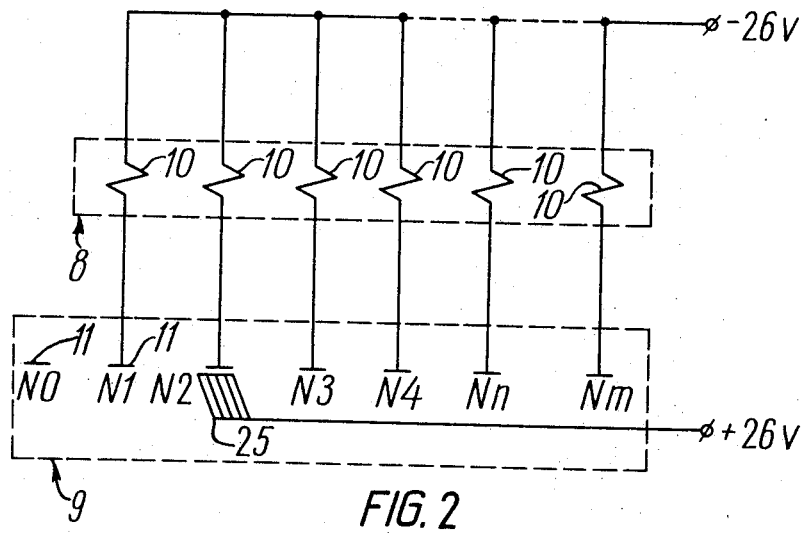
FIG. 2 is a circuit diagram of a program control unit of the computing device.

The program control unit 7 comprises a step-by-step selector 9 (FIG. 2) and windings 10 of the relay 8, the number of said windings corresponding to the number of the electric stations of the power system. Each of the windings 10 of the relay 8 is connected to the $i^{th}$, $(i+m)^{th}$, $(i+2m)^{th}$ etc. lamellae 11 of the step-by-step selector, where $m = n+1$.

The first, $m^{th}$, $2m^{th}$ etc., lamellae are intended to connect contact 12 of the relay 8 (FIG. 1) inserted between the summator 1 and the integrator 3.

The contacts of all the remaining windings 10 of the relay 8 are arranged in the circuits of the integrator 3 and functional unit 6.

Figure 3:
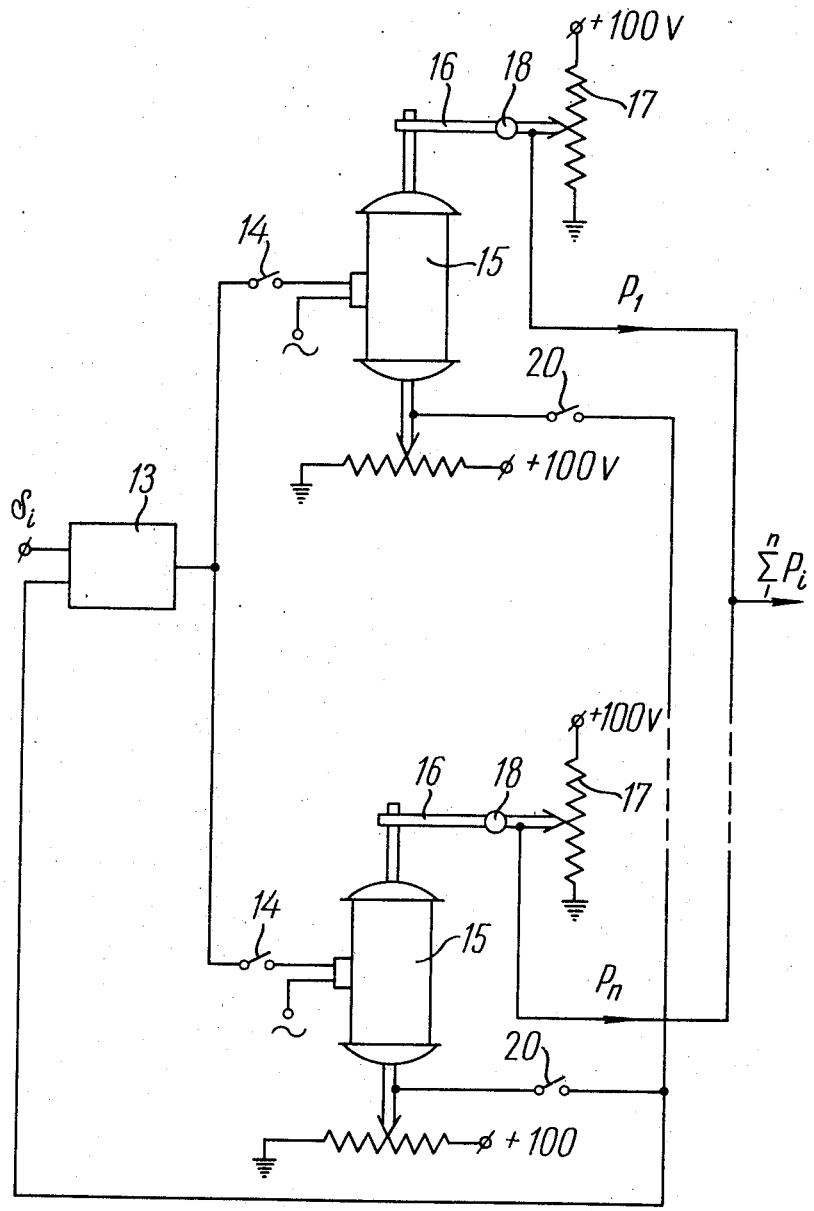
FIG. 3 is a diagram of a functional unit serving to simulate the characteristics of increments of specific fuel consumption.

FIG. 3 presents the diagram of the functional unit 6. The unit 6 comprises an amplifier 13, normally open contacts 14 of the relay 8, electric motors 15, coupled to the amplifier 13 through contacts 14. The shafts of the electric motors 15 mount replaceable cams 16 so profiled as to correspond to the characteristics of relative increments of specific fuel consumption. For every electric station there is provided a set of cams each of which corresponds to the respective equipment and machinery of the particular station. A radial groove is cut on the cam to mount the latter on the shaft of the electric motor 15.

The cam 16 is held on the motor shaft by means of a spring and a sleeve or bushing (not shown in the drawing) which precludes the turning of the cam. The functional unit likewise comprises potentiometers 17 for setting voltages proportional to loads $P_1, P_2 \ldots P_n$, the moving arms of said potentiometer being connected to the cams 16 through pushers 18. The functional unit also comprises potentiometers 19 and normally open contacts 20 of the relay 8, the feedback between the electric motors 15 and the amplifiers 13 being accomplished therethrough.

Figure 4:
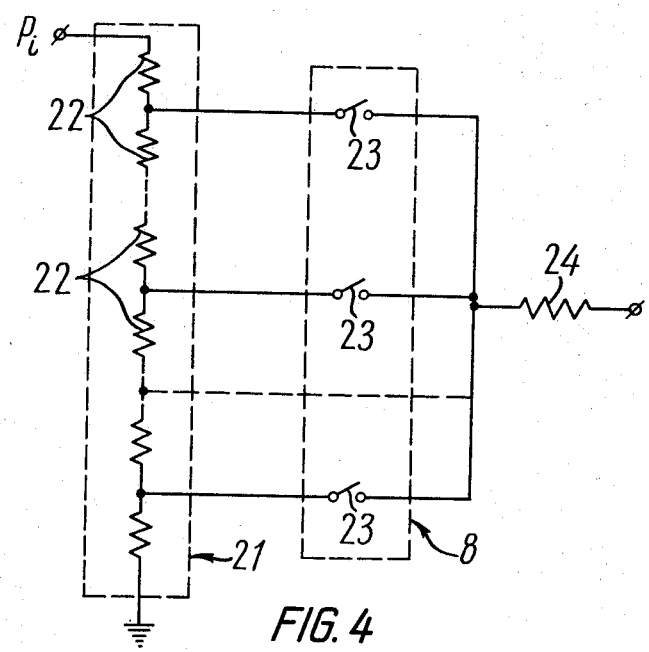
FIG. 4 is a circuit diagram of voltage dividers with a relay commutation circuit.

The voltage dividers 5 (FIG. 4) are made essentially as a sectionalized voltage divider 21 comprising one hundred sections and employing resistors 22. The resistors 22 are connected through the switching members or contacts 23 of the relay 8 and a resistor 24 to the summator 2 (FIG. 1).

The computing device operates as follows.

The problem in the computing device is realized by means of the iterative method. The control over the process is effected by the program control unit 7. The current pulses to switch over the contact slider of the step-by-step selector 9 are delivered from the pulser (not shown in the drawing), conventional for analogue computers.

When the computing device starts operating rotor 25 of the step-by-step selector 9 is set to the zero lamella, all the windings 10 of the relay 8 being de-energized and the contacts 14, 20 and 23 normally open.

The first pulse being fed, the rotor contact of the step-by-step selector shifts from the zero lamella to the first one. The corresponding winding 10 of the relay 8 is alive and the contact 12 makes. The initial condition being $$P_0 \neq \sum_1^n P_i^1, \Delta P \neq 0$$

Therefore the value at the output of the integrator 3 changes and, hence, that of multiplier 4. After the second pulse, the rotor contact of the step-by-step selector becomes switched over to the second lamella. The relay 8 connected to said lamella is alive and all its normally open contacts 14, 20 and 23 make, the contact 12 breaking.

The voltage corresponding to having changed, at the output of the amplifier 13 there appears a voltage which actuates the first motor 15. The motor through the cams 16 and the pushers 18 shifts the moving arm of the potentiometer 17 whereby the voltage corresponding to load $P_1$ changes. The next pulse will cause the rotor contact of the step-by-step selector to shift to the third lamella. The relay 8 coupled to said selector will be energized and the voltage will be set to correspond to loads $P_2$ etc. After the rotor contact of the step-by-step selector shifts from the lamellae $n+1 = m$ to the lamella $n+2$ the second iteration step begins. The lamellae 1, $m+1$, $2m+1$ etc., are electrically interconnected, therefore the contact 12 makes again and the value at the output of the integrator 3 changes again etc.

Thus due to the employment of the program control unit and the switching members the method of repeated use of the arithmetic units can be realized, in the proposed computing device. In this case one summator 2, one multiplying unit 4 and one amplifier 13 are used by being switched in proper succession to solve the equations corresponding to different electric stations of the power system.

Since in the process of obtaining the solution due to the convergence of the iterative process the sum of voltages corresponding to loads $P_1, P_2 \ldots P_n$ approximates the voltage corresponding to $P_0$, $\Delta P$ tends to zero. It has been established experimentally, that the number of steps required in the process of successive approximations to obtain a solution on such a device does not exceed 5–7, this corresponding to 50–100 sec., depending on the value of $n$. When $\Delta P \approx 0$, the operator stops the pulser and takes the readings off the measuring instruments, said readings corresponding to $P_1, P_2 \ldots P_n$. When the load duty of the power system changes a new value of $P_0$ is set accordingly and new values of $P_1, P_2 \ldots P_n$ are accomplished as described above. In case the equipment of the station is changed, a cam should be selected from the set, such that it corresponds to the new state or mode and, after the sleeve or bushing being relieved, the former cam should be replaced by the new one adapted for the purpose.

What I claim is:

1. A computing device for economic distribution of loads among the units of electric stations and among the electric stations of a power system, comprising a summator, an integrating unit having an input coupled to said summator at the output thereof, a multiplying unit having an input connected to the output of said integrating unit, a functional unit to simulate the characteristics of relative increments of specific fuel consumption, said functional unit being coupled to the output of the multiplying unit and being capable of simultaneously storing the load values therefrom, a program control unit coupled to said functional unit for simulation of the characteristics of relative increments of specific fuel consumption, and a relay connected between said summator and integrating unit and coupled to said program unit for selectively interrupting connection between the summator and integrating unit in response to said program control unit.

2. A computing device for economic distribution of loads among the units of electric stations and among the electric stations of a power system, comprising a first summator, an integrating unit having an input coupled to said first summator at the output thereof, a multiplying unit having an input coupled to the output of said integrating unit, a functional unit to simulate the characteristics of relative increments of specific fuel consumption, said functional unit being coupled to the output of said multiplying unit and being capable of simultaneously storing the load values therefrom; a program control unit coupled to said functional unit for simulation of the characteristics of relative increments of specific fuel consumption, a relay connected between said first summator and said integrating unit and coupled to said program control unit for selectively interrupting connection between said summator and integrating unit in response to said program control unit; a voltage divider and a second summator for estimation of the power losses in the power system networks, both being alternatively coupled by means of the program control unit to said multiplying unit.

3. A computing device as claimed in claim 2, wherein to effect simultaneous simulation of the characteristics of relative increments of specific fuel consumption and for storing the load values, the functional unit comprises an amplifier, switching members, electric motors coupled to said amplifier through said switching members and mounting on their shafts replaceable cams so profiled as to correspond to the characteristics of relative increments of specific fuel consumption, potentiometers for setting voltages proportional to the loads involved, coupled to said cams by means of pushers, and further potentiometers and switching members for feedback connection of said electric motors and said amplifier.

References Cited

UNITED STATES PATENTS

| | | | |
|---|---|---|---|
| 2,839,692 | 6/1958 | Kirchmayer | 307—57 |
| 3,270,209 | 8/1966 | Cohn | 307—57 |
| 3,377,544 | 4/1968 | Dickerson | 322—28 |

MALCOLM A. MORRISON, Primary Examiner

R. W. WEIG, Assistant Examiner

U.S. Cl. X.R.

307—57; 322—28